Oct. 18, 1949.  A. C. BRENNEMAN  2,485,475
TENT TRAILER

Filed Sept. 3, 1946  2 Sheets-Sheet 1

INVENTOR
AUGUST C. BRENNEMAN

BY *Mamie C. Davis*
ATTORNEY

Oct. 18, 1949.　　A. C. BRENNEMAN　　2,485,475
TENT TRAILER
Filed Sept. 3, 1946　　2 Sheets-Sheet 2
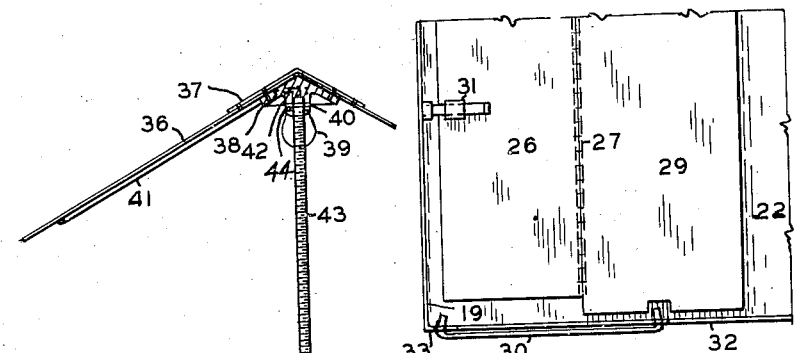
FIGURE 3.
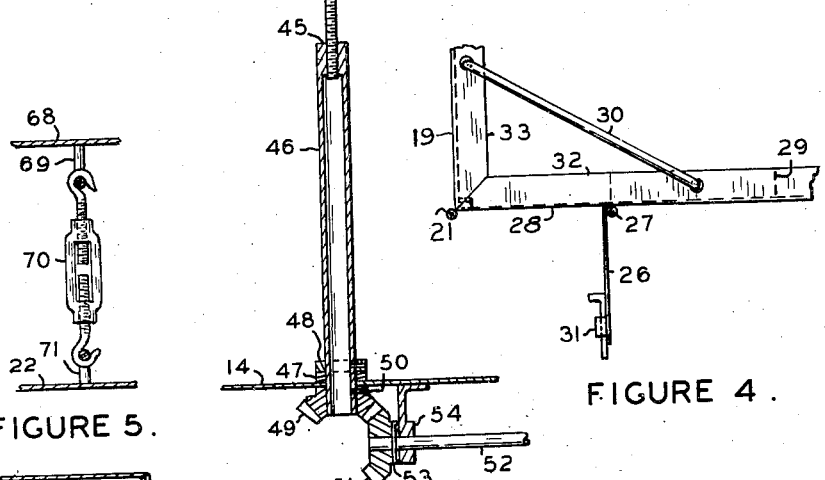
FIGURE 5.　　FIGURE 4.
FIGURE 6.
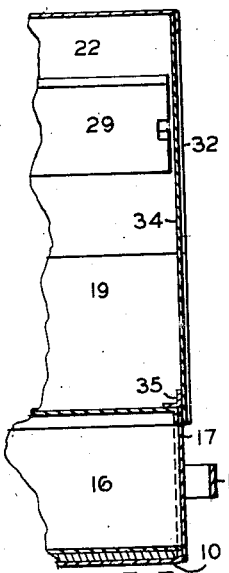
FIGURE 7.
INVENTOR
AUGUST C. BRENNEMAN
BY *Marvin C. Davis*
ATTORNEY Patented Oct. 18, 1949

2,485,475

UNITED STATES PATENT OFFICE 2,485,475

TENT TRAILER

August C. Brenneman, Cleveland, Mo.

Application September 3, 1946, Serial No. 694,535

4 Claims. (Cl. 296—23)

This invention relates to improvements in a small camping trailer to transport the necessary camping equipment in a compact form.

An object of the present invention is to provide a trailer dining table with hinged sides and roof covers thereto that will open outwardly from the dining table to form seats therefor, and when folded over the trailer dining table, form a cover and enclosure the size of the table for a tent and sleeping bags. Other articles may be added when adjusted to fit within the enclosure.

Another object of the present invention is to provide a manually propelled drive below the dining table to extend a retracted tent pole, the tent pole being adjustable is supported preferably vertically in the center of the trailer, operated by the manual drive located below the top of the dining table, and is provided with a pivoted top cap attached or sewed to the peak of a tent. The tent pole, when retracted remains in a vertical position below the trailer top enclosure and when extended supports the top peak of the tent above the center of the table. The tent is erected around the table.

Another object of the present invention is to provide a dining table top trailer with folded seats hinged thereto to form the roof thereabove, and a retracted tent pole vertically mounted within the folded seats, a tent having the peak thereof attached to the top of the tent pole and the folded tent being within the space formed by the folded seats and table top.

Another object of the present invention is to provide a dining table trailer having longitudinal drawers therein, end panels closing the ends of the trailer and locking said drawers, folded seats forming the sides and roof of said trailer and co-operating with said end panels to lock the ends thereof, and said roof enclosures having the ridge ends thereof lapped together for a key lock attachment, thus having all access to the trailer compartments through one key lock.

Another object of the present invention is to provide an electric lamp near the top of the tent pole to be in position for lighting the tent when the tent pole is extended and the tent erected around the trailer dining table, the lamp being connected to the electric circuit of the towing automobile.

Another object of the present invention is to provide means in the roof covers and folding seats to be manually opened for the access of a person's legs while sitting at the table.

With these objects in view the invention further consists of combinations of parts illustrated in the accompanying drawing, described in the specification and more particularly pointed out in the appended claims.

In the drawings:

Figure 3 is an enlarged fragmentary view of a seat opened out with the drop door for access of the legs being closed and latched.

Figure 4 is a fragmentary end view of Figure 3 with the drop door opened.

Figure 5 is an enlarged view illustrating the turnbuckle holding a fragment of the boat to the fragment of the table top.

Figure 6 is an enlarged view of the tent pole in the extended position illustrating the bevel gear drive and the tent cap.

Figure 7 is an enlarged fragmentary view illustrating the interior of one of the drawers and top enclosure.

Figure 1:
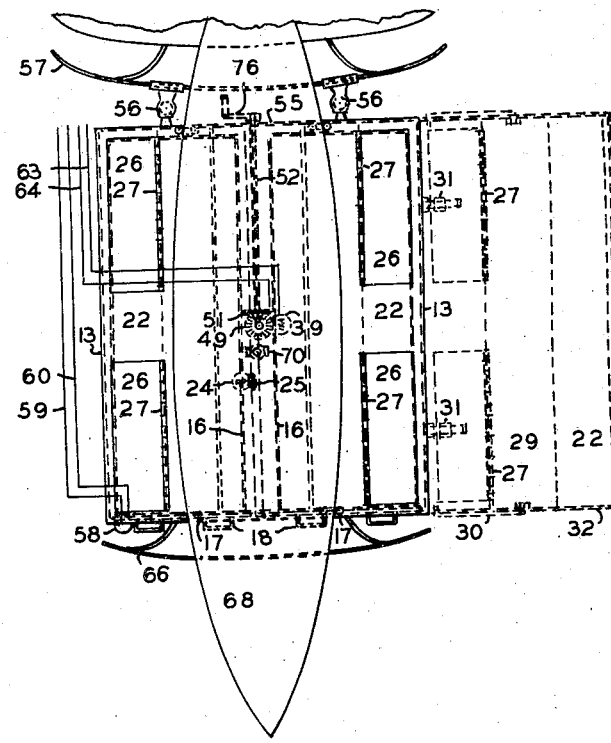
Figure 1 is a plan view of the trailer dining table illustrating a boat mounted above the trailer, the rear portion of a motor car, and ball joint connections from the trailer to the tow car bumper.

The trailer bottom 10 is supported by swivel caster 11 and rubber tire wheel 12. Extending upward therefrom are sides 13 and a dining table top 14. The dining table top 14 is of rectangular shape and extends the full width and length of the trailer.

A pair of longitudinal drawers 16 extend substantially the full length of the trailer and have ends 17 secured thereto with handles 18 for opening the drawers by sliding through the rear end of the trailer between the table top and the bottom of the table.

The drop sides 19 are preferably hinged by piano type hinges 20 connected to the longitudinal edges of the dining table and may be folded from the drop side position as illustrated in dotted lines to the vertical position over the edges of the dining table as illustrated in solid lines.

The hinges 21 connect drop sides 19 with roof coverings 22, the roof covers 22 lapping at 23 to form a ridge above the center of the table. Padlock 24 locks to staple 25 on the covers 22. Drop doors 26 are pivoted at 27 to covers 22 to provide access means for leg openings 28 for persons occupying seats 29 when in the opened position as illustrated in dotted lines. Slip on rods 30 connect drop sides 19 to roof covers 22 when in the opened position and are manually removed when the sides and roof covers are manually closed as illustrated in solid lines.

The leg access means or drop doors 26 are held fast by latches 31 when in the closed or folded position. The doors 22 and sides 19 are provided with end flanges 32 and 33 respectively to hold end panels 34 when in the closed position. The end panels 34 lap over the drawer fronts 17 and are supported on the table by angle irons 35, the panels 34 being held between flanges 32 and seats 29.

A tent 36 is provided with a cap 37 and is secured to the tent pole cap 38, a lamp 39 and socket 40 being connected thereto with an electric cable 41 leading therefrom to a suitable source of electric current. A cap 38 is provided with a boss 42 to receive a threaded rod 43 pinned at 44 in the boss 42. The threaded rod 43 is connected to threaded boss 45 to form an extended tent pole with tubing 46 joining boss 45 and being rotatably supported in table top 14 by means of thrust collar 47, set collar 48 and a bevel gear 49 mounted below the tabletop 14 and pinned to the tubing 46 at 50. A bevel gear 51 as a driving connecting means is pinned to longitudinal shaft 52 by pin 53 and meshes with bevel gear 49, the shaft 52 being supported by bearing 54 suspended from table top 14.

The longitudinal shaft 52 extends from bevel gear 51 between the two drawers 16 to the trailer end 55, the shaft 52 passing through the end 55 and receiving a hand driving means or crank 76 thereon.

Ball hitches 56 connect the trailer end 55 to a towing car bumper 57. A tail light 58 is of a conventional type and has electrical wires 59 and 60 leading to the towing car. Reflectors 61 and 62 are mounted on the drawers 17 as a matter of State regulation. A cable 41 leading from the socket 40 is provided with wires 63 and 64 leading toward the electrical circuit of the towing car.

The enclosure covering only the top of the dining table is formed by members 19, 22, 34 and 14 and receives the tent 36 in a folded position with sleeping bags 65 arranged between the folded tent 36 and table top 14. A bumper 66 is arranged on the back of the trailer. Yokes 67 are welded to the roof covers 22 to support an inverted boat 68, the boat 68 having an eye 69 for the reception of a turnbuckle take-up connected to an eye 71 welded to the top of one of the roof covers 22.

Figure 2:
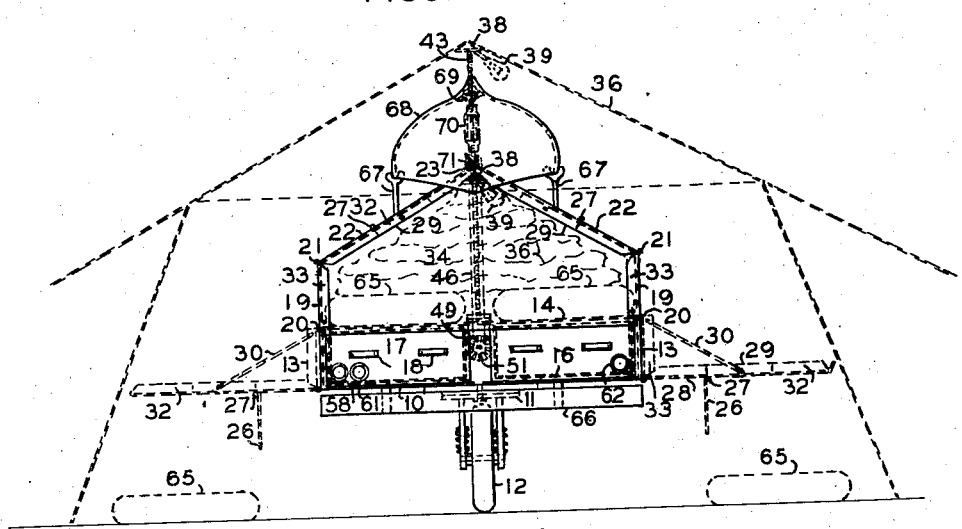
Figure 2 is a rear view of Figure 1, and with the seats opened up illustrated in dotted lines, the pole and tent, being shown with dotted lines in a raised position.

In operation the trailer is connected to the bumper of the towing car by the ball hitches 56, the drawers 16 are filled with the necessary provisions, hunting equipment, stove, portable refrigerator, and the like. The sleeping bags 65 are laid on the top of the table 14, the tent folded above the sleeping bags and the tent pole retracted to within the enclosure as illustrated in Figure 2. The end panels 34 are then placed against the drawers with the angle irons 35 resting on the table top. The side panels 19 and roof cover 22 are folded over the tent and the retracted tent pole, the end flanges 32 and 33 holding and locking the end panels 34. A padlock or any type of key lock is then used to lock the two roof covers 22 together. A boat is inverted and placed on the yokes 67 and held fast to the roof covers 22 by turnbuckle 70 connecting eye 69 to eye 71 and the trailer is ready for a camping trip.

When it is desired to make camp the trailer is pulled over the desired location and left hitched to the towing car. The boat is removed, the roof covers 22 and side panels 19 are opened up to the dotted positions as illustrated in Figure 2 and slip on rods 30 connect the drop sides 19 with cover 22. The leg access means or drop doors 26 are unlatched at 31 so that persons may sit on seats 29 and have their legs pass through the openings 28 to the ground below or beneath the dining table. The crank 56 is manually turned until the tent pole is extended to the full height, the tent 36 is erected about the trailer as indicated in dotted lines of Figure 2, the lamp 39 is in position for lighting the table and the tent interior, and the drawers 16 may be opened for the stove and other provisions. Thus a complete camp is established within a few moments from the arrival on the desired location.

What I claim as new and desire to secure by Letters Patent is:

1. A camping trailer dining table, sides, said sides pivoted to the top of said dining table, roof covers, said roof covers pivoted to said sides, a ridge formed by one edge of each of said roof covers lapping above the center of said dining table, said roof covers and sides hinged to manually swing outwardly to form seats thereof at the sides and below the top of said dining table, means to support said seats, and means in said roof covers to be manually opened to allow a person's legs to pass therethrough to beneath the bottom of the table.

2. A camping trailer dining table having a top and sides, drop sides, said drop sides pivoted to the top of said dining table, roof covers, said roof covers being connected to said drop sides, a sloping weather resisting roof formed by said roof covers and spaced above the top of said table, said roof covers with said drop sides pivoted to manually swing outwardly from the top and sides of said table to form seats thereof at the sides and below the top of said table, means to support said seats, and means to provide access for a person's legs between said table and seats.

3. A camping trailer dining table having a top and sides, drop sides, said drop sides normally above the top of said table, said drop sides pivoted to the sides of said dining table, roof covers, said roof covers being connected to said drop sides and spaced above said dining table top, said roof covers with said drop sides pivoted to manually swing outwardly from the sides of said table to form seats thereof at the sides and below the top of said table, means to support said seats from said table, and means to provide access for a person's legs between said table and seats.

4. A camping trailer dining table having a top and sides, drop sides, said drop sides hinged to the sides of said dining table, said drop sides normally above the top of said table, roof covers, said roof covers being hinged to said drop sides and spaced above said dining table top, said roof covers with said drop sides hinged to manually swing outwardly from the sides of said table to form seats thereof at the sides and below the top of said table, members to support said seats from said table, and means to provide access for a person's legs between the sides of said table and said seats.

AUGUST C. BRENNEMAN.

REFERENCES CITED

The following references are of record in the file of this patent:

UNITED STATES PATENTS

| Number | Name | Date |
|---|---|---|
| 550,418 | Miller | Nov. 26, 1895 |
| 818,665 | Burton | Apr. 24, 1906 |
| 1,283,898 | Reid | Nov. 5, 1918 |
| 1,390,137 | King | Sept. 6, 1921 |
| 1,534,337 | Watson | Apr. 21, 1925 |
| 1,669,611 | Goldberg | May 15, 1928 |
| 1,715,971 | Wilson | June 4, 1929 |
| 1,864,047 | Lawhorne | June 21, 1932 |
| 2,038,001 | Redding | Apr. 21, 1936 |
| 2,152,713 | Stewart | Apr. 4, 1939 |
| 2,154,810 | Goeddertz | Apr. 18, 1939 |
| 2,216,553 | Greene et al. | Oct. 1, 1940 |
| 2,249,845 | Mitchell | July 22, 1941 |
| 2,301,431 | Hart | Feb. 9, 1943 |